US005923895A

United States Patent [19]
Nookala et al.

[11] Patent Number: 5,923,895
[45] Date of Patent: Jul. 13, 1999

[54] METHOD AND ARRANGEMENT TO EFFECTIVELY RETRIEVE RESIDUAL DATA FROM A BUFFER

[75] Inventors: Narasimha R. Nookala, San Jose; Otto Sponring, Los Altos; Kameswaran Sivamani, Sunnyvale, all of Calif.

[73] Assignee: Cirrus Logic, Inc., Fremont, Calif.

[21] Appl. No.: 08/751,188

[22] Filed: Nov. 15, 1996

[51] Int. Cl.[6] .............................. G06F 13/00; G11C 7/00

[52] U.S. Cl. ........................... 395/821; 365/83; 365/219; 395/200.64

[58] Field of Search ...................... 365/219; 395/200.64, 395/821

[56] References Cited

U.S. PATENT DOCUMENTS 5,241,660 8/1993 Michael et al. .................... 395/200.64
5,412,610 5/1995 Suzuki .................................... 365/219

*Primary Examiner*—Ayaz R. Sheikh
*Assistant Examiner*—Frantz Blanchard Jean
*Attorney, Agent, or Firm*—Frank D. Nguyen

[57] ABSTRACT

A mechanism to effectively retrieve residual data received from a serial data source is provided. As the shift register receives serial data from the serial data source, the activities and content of the shift register is monitored. Status bits are set to reflect the activities and content. These status bits are used to determine whether the shift register contains residual data and whether such residual data should be ignored the serial data received from the serial data source is output to a destination.

5 Claims, 3 Drawing Sheets

FIG. 3A
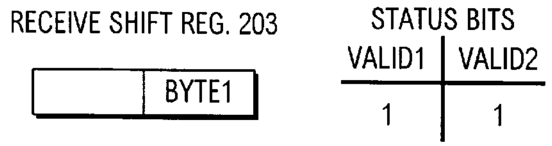
FIG. 3B
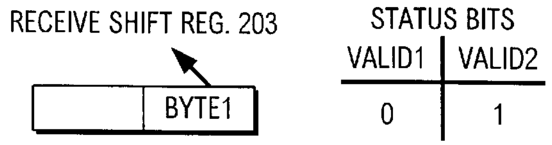
FIG. 3C
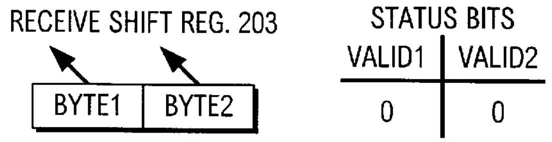
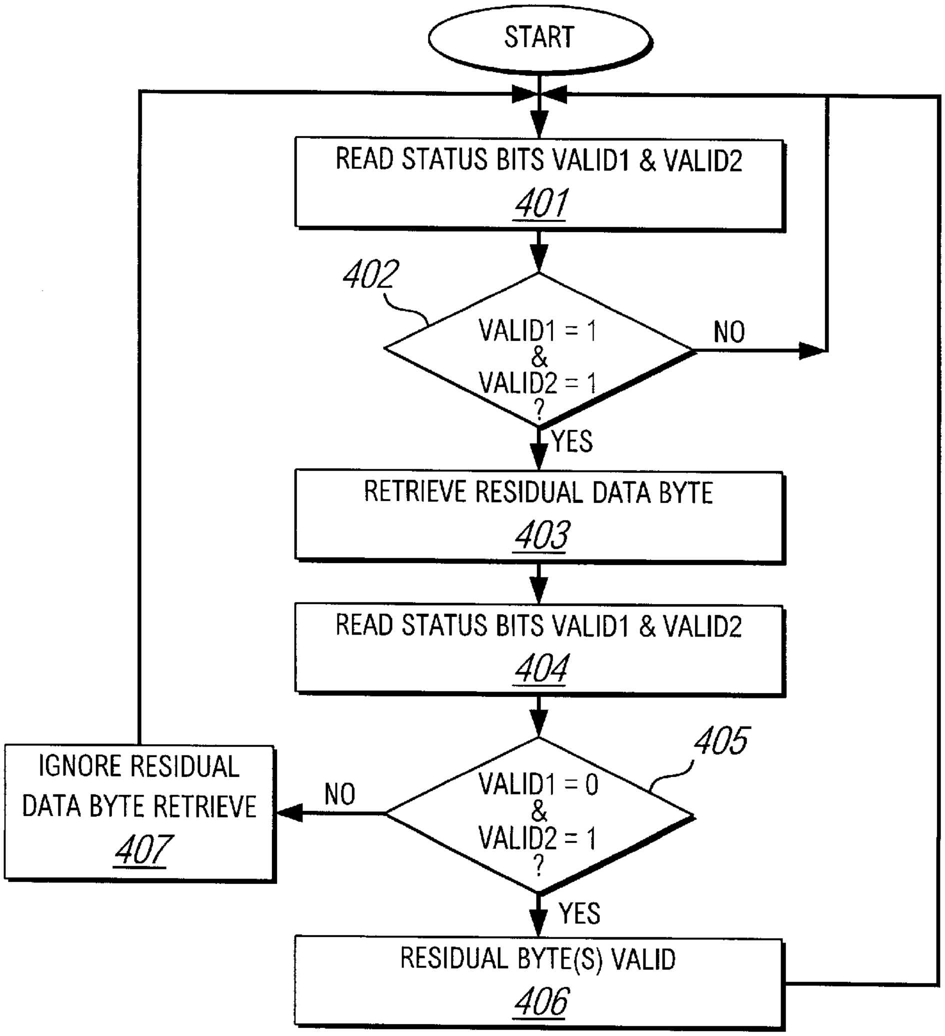
FIG. 4

METHOD AND ARRANGEMENT TO EFFECTIVELY RETRIEVE RESIDUAL DATA FROM A BUFFER

FIELD OF THE INVENTION

The invention generally relates to computer systems, and more particularly relates to computer data transfer.

BACKGROUND OF THE INVENTION

Most computer input/output (I/O) peripherals such as modems, keyboards, and cathode-ray-tube (CRT) terminals are serial in nature. As such, first-in-first-out (FIFO) buffers are used in serial interfaces, which are implemented between central processing unit (CPU) and serial I/O peripherals, to ensure that output data is always in the same order as input data. In addition, FIFO buffers are used to compensate for different transfer rates between the serial I/O peripherals and the central processing unit. In other words, a FIFO buffer can accept data from the source unit at one rate of transfer and deliver the data to the destination unit at another rate.

Currently, serial I/O peripherals are byte oriented. That is they transfer a byte of data at a time. However, recent advances in computer technology result in CPU that can support even higher serial data transfer rates such as two or more bytes at a time. To support higher serial data transfer rates, FIFO buffers with increased data storage capabilities are needed. Generally, the storage capability of a FIFO buffer can be increased by increasing the width of the FIFO buffer, increasing the depth of the FIFO buffer, or both. In increasing the storage capability of a FIFO buffer, system design constraints and associated costs are important considerations that may dictate the design. For example, a design having an increased FIFO depth may require a larger surface area than a design having an increased FIFO width resulting in a larger footprint, for the control logic and the data path combined, and consequently higher manufacturing costs. For this reason, it may be more desirable to increase the FIFO width rather than the FIFO depth in increasing the FIFO buffer storage capability.

However, increasing the FIFO buffer storage capacity by increasing the FIFO width creates challenges that must be overcome. One such challenge involves residual data bytes in the receive mode. Consider, as example, a synchronous serial interface uses to perform serial-to-parallel and parallel-to-serial data conversion. As data is serially received from the input port, it is shifted into a shift register which is normally sized to have the same bit-width (e.g., 2 bytes) as the FIFO buffer. The shift registers content is then loaded in parallel into the FIFO buffer prior to being sent to a destination. For improved bandwidth, the shift register is designed so that its content is sent to the FIFO buffer when it is filled with data.

Because the length of a message received is arbitrary, the shift register may not be filled at the end of a data message transfer. As a result, a number of residual data bytes may remain in the shift register at the end of a data message transfer because the shift register is not filled up. The shift register may also store residual data bytes if a data message transfer from the input port is interrupted leaving the shift register partially filled. In this case, the remaining message is sent to the shift register when data transfer resumes. Because the residual data bytes may represent the end of the data message which is not known at the time, the residual bytes need to be retrieved in both cases to avoid potential data loss.

In doing so, however, the residual data bytes may be retrieved twice in the case where the remaining data bytes are subsequently received following an interrupt. This can cause redundant data bytes in a data message which may cause confusion and lead to error conditions such as an incorrect data byte count during error detection.

Thus, a need exists for an arrangement, system, and method to allow residual data bytes to be retrieved effectively.

SUMMARY OF THE INVENTION

Accordingly, the present invention provides an arrangement, system, and method to effectively retrieve residual data.

The present invention meets the above need with an arrangement to effectively retrieve residual data received from a serial data source. The arrangement comprises a receive shift register, a receive FIFO, a processor, a status register, and memory.

The receive shift register is coupled to the serial data source to receive data from the serial data source. The receive shift register has a storage capacity of N data bytes. The receive FIFO has a storage capacity of at least N data bytes. The receive FIFO is coupled to the receive register to receive data transferred in parallel from the receive shift register. The receive FIFO outputs data received in parallel.

The processor is coupled to the receive shift register and the receive FIFO. The processor monitors activities and content of the receive shift register. The processor sets status bits in the status register to reflect the activities and the content of the receive shift register. The memory is coupled to the processor. The memory stores instruction codes which is executed by the processor to determine, based on the status bits, which residual data to ignore in the receive FIFO. The processor utilizes the information as to which residual data to ignore to selectively retrieve data outputted by the receive FIFO.

All the features and advantages of the present invention will become apparent from the following detailed description of its preferred embodiment whose description should be taken in conjunction with the accompanying drawings.

BRIEF DESCRIPTION OF THE DRAWINGS

FIGS. 3A–3C are diagrams illustrating the states of the status bits in the preferred embodiment of the present invention.

FIG. 4 is a flow chart of the instruction codes stored in the memory shown in FIG. 1 which is executed by the central processor to determine whether the residual data retrieved is valid.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
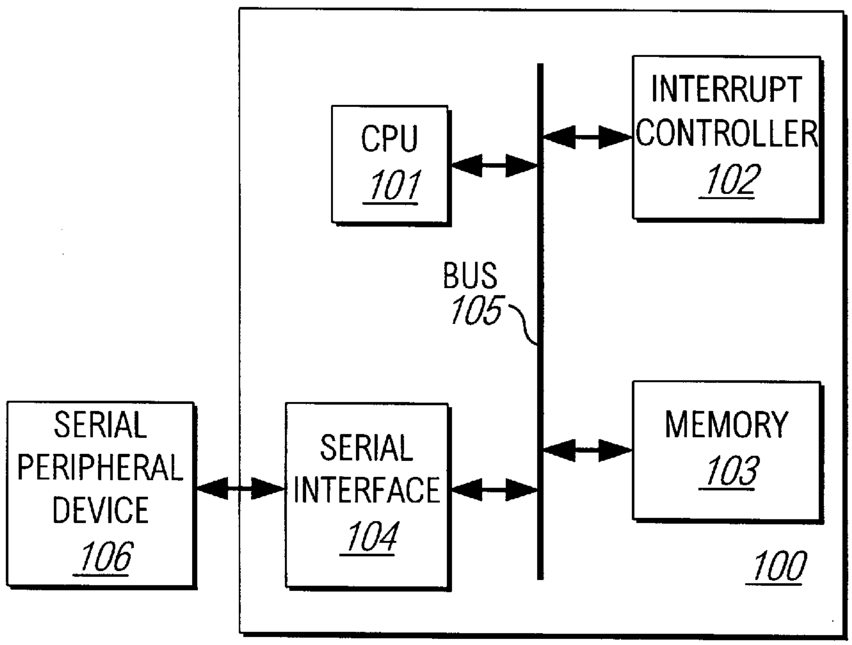
FIG. 1 is a block diagram illustrating a computer system that implements a synchronous serial data interface in accordance with the present invention.

Reference is made to FIG. 1 illustrating a block diagram of computer system 100 in accordance with the present invention. Computer system 100 consists of central processing unit (CPU) 101, interrupt controller 102, memory 103, and serial interface 104 which are coupled together by bus 105. Preferably, serial interface 104 supports synchronous communications. Serial interface 104 is in turn coupled to serial peripheral device 106 which can be a keyboard, a modem, etc. If serial peripheral device 106 is a modem, serial peripheral device 106 connects computer system 100 to data communication networks.

As data is transferred between computer system 100 and serial peripheral device 106, serial interface 104 performs serial-to-parallel and parallel-to-serial conversions. In the receive mode, when data serial-to-parallel conversion is completed and receive FIFO is full, serial interface 104 signals to CPU 101 through an interrupt from interrupt controller 102 to indicate that data is available and ready. In response, CPU 101 retrieves the binary data from serial interface 104 and transfers them into memory 103 over data bus 105. CPU 101 then assembles the binary data into data words. In the transmit mode, when CPU 101 is ready to send data to serial interface 104, CPU 101 first checks the status of serial interface 104. If the transmitter FIFO is not full, CPU 101 sends data to serial interface 104 for transmission. Memory 103 also stores software used by CPU 101 to control the operation of serial interface 104 in accordance with the present invention. In the preferred embodiment, memory 103 is a random access memory (RAM). It should be clear to a person of ordinary skill in the art that such software can also be stored in a separate memory.

Figure 2:
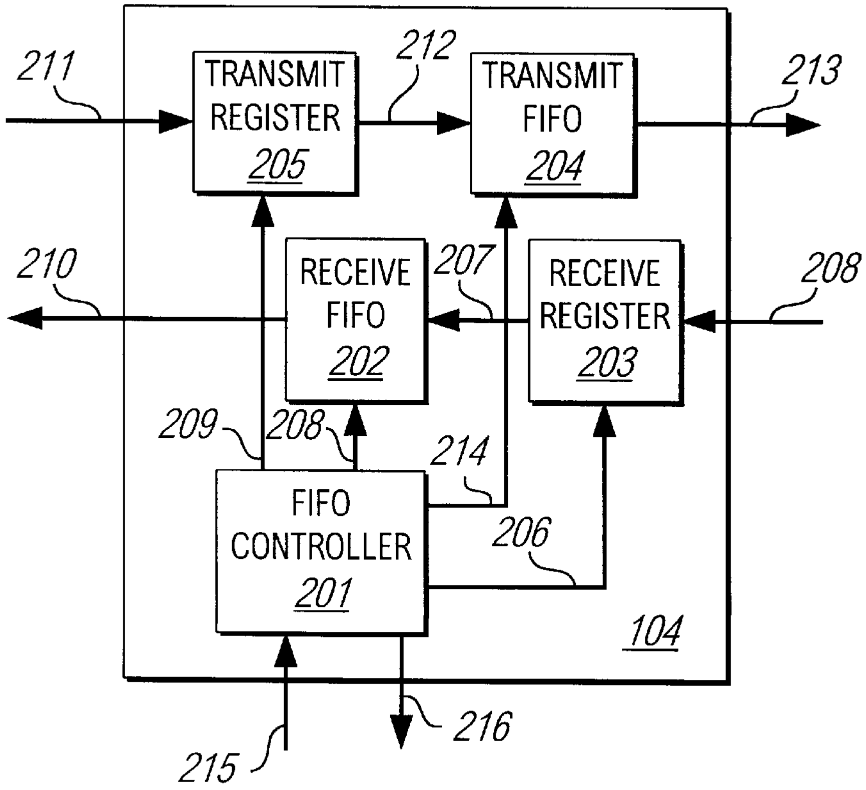
FIG. 2 is a block diagram illustrating the synchronous serial data interface shown in FIG. 1.

FIG. 2 is a block diagram illustrating in more detail serial interface 104. Serial interface 104 consists of FIFO controller 201, receive FIFO 202, receive shift register 203, transmit FIFO 204, and transmit shift register 205. Under the control of CPU 101, FIFO controller 201 oversees the data transfer to and from serial interface 104. CPU 101 sends signals 215 to check the status of serial interface 104 prior to a read (i.e., receive) or write (i.e., transmit) operation. CPU 101 also sends read and write commands over signals 215. Moreover, signals 215 include a datavalid signal from CPU 101 to serial interface 104 indicating whether the residual data byte(s) retrieved are valid. Serial interface 104, more particularly FIFO controller 201, communicates with CPU 101 through signals 216. Signals 216 interrupt CPU 101 to initiate a receive operation and status signals to indicate the status of receive FIFO 202 and transmit FIFO 204. Signals 216 also alerts CPU 101 when a residual data byte exists at the end of a data transfer.

During a receive operation, receive shift register 203 receives serial data from serial peripheral device 106. Receive shift register 203 provides signals 206 to indicate its status to FIFO controller 201 which in turn passes this information to CPU 101 through signals 216. In the preferred embodiment, FIFO controller 201 supplies a load signal along signals 208 to command receive FIFO 202 to retrieve the content of receive shift register 203 in parallel along signal 207 when receive shift register 203 is full (i.e., having two data bytes). When instructed by CPU 101, FIFO controller 201 may also supply a load signal to command receive shift register 203 to pop its content in parallel to receive FIFO 202 along signal 207 when receive shift register 203 contains a residual data. Next, FIFO controller 201 also commands receive FIFO 202 to output its content over signal 210 which is coupled to bus 105. FIFO controller 201 checks the status (e.g., empty, full, etc.) of receive FIFO 202 over signal 208. It is to be appreciated that when receive shift register 203 transfers its content to receive FIFO 202 because it is full, receive shift register 203 is empty afterward. On the other hand, when receive shift register 203 pops its content to receive FIFO 202 in response to a command from processor 101, receive shift register 203 still retains its contents. It should be clear to a person of ordinary skill in the art that FIFO controller 201 is well known and commonly used in the art.

In the preferred embodiment, receive shift register 203 has a storage capacity of two data bytes and receive FIFO 202 has a storage capacity 4×2 data bytes. As such, the residual data byte at the end of a data transfer scenario involves a single (one) residual data byte in the preferred embodiment. It should be clear to a person of ordinary skill in the art that the use of receive shift register and receive FIFO having storage capacity greater than that in the preferred embodiment which results in one or more residual data bytes is also within the scope of the present invention.

When receive shift register 203 contains a residual data byte at the end of a data transfer, FIFO controller 201 alerts CPU 101 of this condition over signals 216. CPU 101 utilizes two status bits, valid1 and valid2, in SYSCON2 register to determine whether or not to "ignore" the residual data byte (i.e., whether the residual byte is valid). This prevents residual data bytes from being retrieved twice causing inefficiency and error conditions. Status bits valid1 and valid2 are set to reflect the status of receive shift register 203. More particularly, status bit valid2 is used to indicate whether receive shift register contains a residual data byte and status bit valid1 is used to indicate the status of the residual data byte which is the least significant data byte in receive shift register 203. Accordingly, FIFO controller 201 sets bits valid1 and valid2 high (one) when receive shift register 203 contains a residual bit. Bit valid1 is set low (zero) either when receive shift register 203 receives a new data transfer or when the content of receive shift register 203 is popped to receive FIFO 202. Bit valid2 is set low (zero) only when receive shift register 203 receives a new data transfer.

FIGS. 3A–3C illustrates the possible states of status bits valid1 and valid2. FIG. 3A shows the respective values of status bits valid1 and valid2: 1 and 1, when there is a residual data byte byte1 in receive shift register 203. FIG. 3B shows the respective values of status bits valid1 and valid2: 0 and 1, after the residual data byte byte1 has been popped to receive FIFO 202 and receive shift register 203 receives no new data transmission. In this case, the residual data byte byte1 is popped to receive FIFO 202, as indicated by the arrow, hence bit valid1 is set to low (zero). However, as discussed earlier, the residual data byte is retained in receive shift register in a pop operation, hence bit valid2 is still high (one). Another way to look at this is that receive shift register 203 receives no new data transmission, hence bit valid2 is still high (one). FIG. 3C illustrates the respective values of status bits valid1 and valid2: 0 and 0, when receive shift register 203 receives at least one new data byte byte2 following an interruption prior to which the residual data byte byte1 is received. FIG. 3C also illustrates the values of status bits valid1 and valid2 when receive shift register 203 receives two sequential data bytes with no interruption. In either case, bits valid1 and valid2 have low (zero) values because receive shift register 203 receives no new transmission. Moreover, receive shift register 203 is empty (i.e., no residual data byte). As discussed earlier, when receive shift register 203 contains two data bytes, it is filled. Hence, its content is automatically transferred into receive FIFO 202, as indicated by the arrows. Thereafter, receive shift register 203 is empty.

Referring now to FIG. 4 illustrating a flow chart of the instruction codes stored in memory 103 which when executed by CPU 101 helps to determine whether or not to ignore the residual data byte. In step 401, CPU 101 reads status bits valid1 and valid2. In step 402, CPU determines whether status bits valid1 and valid2 are both high. If status bits valid1 and valid2 are not both high (one) indicating that receive shift register 203 does not contain a residual data byte, no action needs to be taken by CPU 101 except continuing to monitor status bits valid1 and valid2. Conversely, if status bits valid1 and valid2 are both high indicating that receive shift register 203 contains a residual data byte, CPU 101 signals FIFO controller 201 to load the content of receive shift register 203 into receive FIFO 202 (step 303). In doing so, CPU 101 ensures that the residual data byte is retrieved since FIFO controller 201 only transfers the content of receive shift register 203 into receive FIFO 203 when shift register 203 is full.

Next, CPU again reads status bits valid1 and valid2 (step 404) to gain additional clues as to whether the residual data byte is valid (i.e., no remaining data byte is subsequently received by receive shift register). In step 405, CPU 101 determines whether status bits valid1 and valid2 are set to low (zero) and high (one), respectively. If status bits valid1 and valid2 are low and high, respectively, indicating that no new data transmission occurs and hence no remaining data byte is subsequently received. As a point of reference, bit valid1 is set low (zero) here because the content of receive shift register 203 has been transferred to receive FIFO 202 earlier in step 403. In this case, the residual data byte retrieved is valid and no step needs to be taken by CPU 101 except to continue monitoring status bits valid1 and valid2 for the next residual data byte (step 406).

On the other hand, if status bits valid1 and valid2 are both low (zero), this indicates that receive shift register 203 receives a new data transmission of at least one data byte. This is because as the new data byte is serially shifted into receive shift register 203, FIFO controller 201 automatically transfers the content of receive shift register 203 containing the residual data byte and the new data byte into receive FIFO 202 thereby clearing both status bits valid1 and valid2. In this case, CPU 101 will be reminded to ignore the residual data byte retrieved earlier (e.g., in step 403) the content of receive FIFO 202 is transferred to memory 103. Control is then transferred back to step 401 to monitor status bits valid1 and valid2 for residual data byte.

Likewise, if status bits valid1 and valid2 are both high (one), this indicates that the receive shift register 203 receives a new data transmission of at least two data bytes. The reason is as the first of two new data bytes is serially shifted into receive shift register 203, FIFO controller 201 automatically loads the content of shift register 203 containing the current residual data byte and the first data byte into receive FIFO 202 thereby clearing both status bits valid1 and valid2. Then, when receive shift register 203 receives the second data byte as the "new" residual data byte, status bits valid1 and valid2 are set high (one). Here, CPU 101 is also reminded to ignore the residual data byte retrieved earlier when the content of receive FIFO 202 is transferred into memory 103. Control is then transferred back to step 401 to monitor status bits valid1 and valid2 for residual data byte.

It should be clear to a person of ordinary skill in the art that additional status bits (e.g., valid3, valid4, etc.) can be added to extend the current invention to cases where there are more than one residual data bytes (e.g., storage capacity of receive shift register 203 and receive FIFO are more than two data bytes). A new status bit is needed for each additional residual data byte. Hence, a status bit is associated with a predetermined data byte location in receive shift register 203. The rules for setting and clearing the status bits remain the same. Take for example the case involving two or less residual data bytes. In this case, three status bits valid1, valid2, and valid3 are required and are also set to reflect the status of receive shift register 203. More particularly, status bit valid3 is used to indicate whether receive shift register contains a residual data byte while status bits valid1 and valid2 are used to indicate the status of each corresponding residual data byte. Accordingly, bits valid1, valid2, and valid3 are all set high (one) when receive shift register 203 contains two residual data bytes. If there is one residual data byte, bits valid2 and valid3 are set high (one) while bit valid1 is set low (zero). Bits valid1 and valid2 are set low (zero) when there is no corresponding residual data byte, when receive shift register 203 receives a new data transfer, or when the corresponding residual data byte is transferred to receive FIFO 202. Bit valid3 is set low (zero) only when receive shift register 203 receives a new data transfer.

Figure 5A:
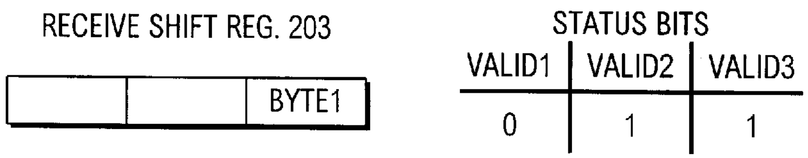
FIGS. 5A–5E are diagrams illustrating, as an example, the states of the status bits in an embodiment where up to two residual data bytes are possible.
Figure 5B:
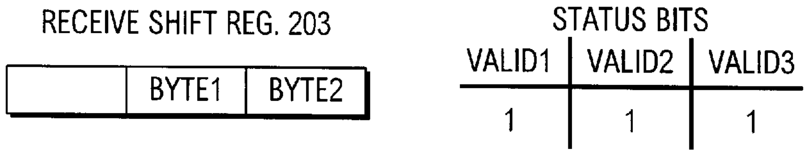

FIGS. 5A–5E illustrates the possible states of status bits valid1, valid2, and valid3 for the above example. FIG. 5A shows the respective values of status bits valid1, valid2, and valid3: 0,1, and 1, when there is a residual data byte in receive shift register 203. While bit valid1 is set to low (zero) because receive shift register 203 does not contain a residual data byte at the corresponding data byte location byte2, bit valid2 is set to high (one) because shift register 203 contains a residual data byte at the data byte location byte1. Bit valid3 is set high (one) because receive shift register 203 contains a residual data byte. FIG. 5B shows the respective values of status bits valid1, valid2, and valid3: 1,1, and 1, when there are two residual data bytes in receive shift register 203. Bits valid1, valid2, and valid3 are all set high (one) because there are two residual data bytes at data byte locations byte1 and byte2.

Figure 5C:
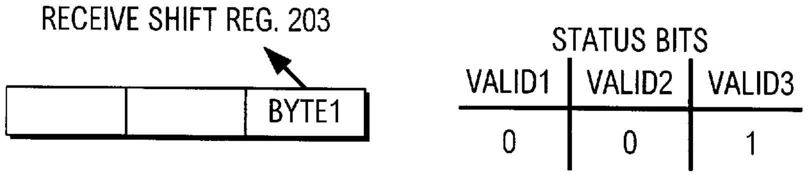
Figure 5D:
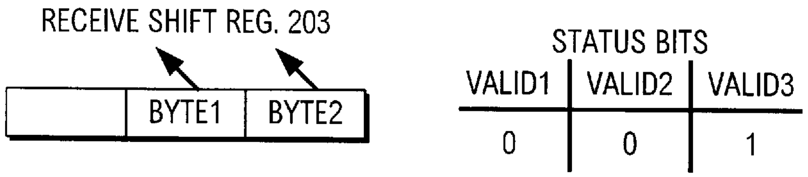

FIG. 5C shows the respective values of status bits valid1, valid2, and valid3: 0, 0, and 1, after the residual data byte byte1 has been popped to receive FIFO 202 and receive shift register 203 receives no new data transmission. In this case, there is no corresponding residual data byte for bit valid1. Hence bit valid1 is set low (zero). Moreover, receive shift register 203 has popped residual data byte byte1 to receive FIFO 202, as indicated by the arrow, hence bit valid2 which is associated with the data byte location byte2 is set to low (zero). However, receive shift register 203 still contains the residual data byte following a pop operation, hence bit valid3 is still high (one). Another way to look at this is that receive shift register 203 receives no new data transmission. FIG. 5D shows the respective values of status bits valid1, valid2, and valid3: 0, 0, and 1, after the residual data bytes byte1 and byte2 have been popped to receive FIFO 202 and receive shift register 203 receives no new data transmission. In this case, there is a corresponding residual data byte for both bits valid1 and valid 2. However, the two residual bytes byte1 and byte2 have been popped to receive FIFO 202 as indicated by the arrows. Hence both bits valid1 and valid2 are set low (zero). Since receive shift register 203 still contains the residual data bytes following a pop operation, bit valid3 is still high (one). Additionally, receive shift register 203 receives no new data transmission.

Figure 5E:
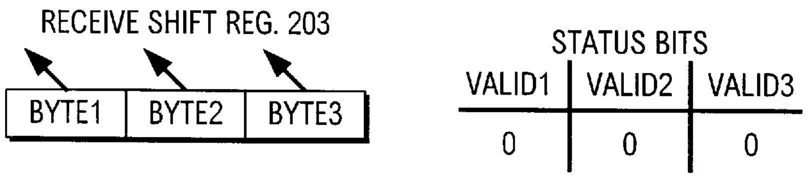

FIG. 5E illustrates the respective values of status bits valid1, valid2, and valid3, all zeros, when receive shift register 203 receives one or more data bytes following an interruption prior to which at least one residual data byte was received. FIG. 5E also illustrates the values of status bits valid1, valid2, and valid3 when receive shift register 203 receives three sequential data bytes with no interruption. In either case, bits valid1, valid2, and valid3 all have low (zero) values because receive shift register 203 receives no new transmission. Moreover, receive shift register 203 is empty (i.e., no residual data byte). As discussed earlier, when receive shift register 203 contains two data bytes, it is filled. Hence, its content is automatically transferred into receive FIFO 202, as indicated by the arrows. Thereafter, receive shift register 203 is empty.

Similarly, it should be clear to a person of ordinary skill in the art that the instruction codes discussed in FIG. 3 can easily be modified to extend the current invention to cases where there are more than one residual data bytes.

Referring back to FIG. 2, during a transmit operation, transmit shift register 205 receives serial data from memory 103 via bus 105. Transmit shift register 205 provides signals 209 to indicate its status to FIFO controller 201 which in turn passes this information to CPU 101 through signals 216. In the preferred embodiment, FIFO controller 201 supplies a load signal along signals 214 to command transmit FIFO 204 to retrieve the content of transmit shift register 205 along signal 212 when transmit shift register 205 is full (i.e., having two data bytes). Next, FIFO controller 201 commands transmit FIFO 204 to output its content over signal 213 which is coupled to bus 105. FIFO controller 201 checks the status (e.g., empty, full, etc.) of transmit FIFO 204 over signal 214. In the preferred embodiment, transmit shift register 205 has a storage capacity of two data bytes and transmit FIFO 204 has a storage capacity 4×2 data bytes.

The preferred embodiment of the present invention, an arrangement to allow firmware to be dynamically written into a programmable memory from a remote location, is thus described. While the present invention has been described in particular embodiments, the present invention should not be construed as limited by such embodiments, but rather construed according to the below claims.

What is claimed is:

1. An arrangement to effectively retrieve residual data received from a serial data source comprising:

a receive shift register coupled to the serial data source, the receive shift register having a storage capacity of N data bytes, the receive shift register receiving data from the serial data source;

a receive FIFO coupled to the receive register, the receive FIFO having a storage capacity of at least N data bytes, the receive FIFO receiving data transferred in parallel from the receive shift register when the receive shift register is full, the receive FIFO outputting data received in parallel;

a processor coupled to the receive shift register and the receive FIFO, the processor monitoring activities and content of the receive shift register;

a status register coupled to the processor, the processor setting status bits in the status register to reflect the activities and the content of the receive shift register, wherein the status register having N status bits, one of the N status bits indicating whether the receive shift register currently contains at least one residual data byte, each of the remaining (N−1) status bits indicating whether there is a residual data byte at a predetermined corresponding data byte location in the receive shift register; and memory coupled to the processor, the memory storing instruction codes, the instruction codes when executed by the processor determining, based on the status bits, which residual data to ignore in the receive FIFO, the processor utilizing information as to which residual data to ignore to selectively retrieve data outputted by the receive FIFO;

wherein data stored in the receive shift register being popped to the receive FIFO in response to a command from the processor, the data stored in the receive shift register being transferred to the receive FIFO when the receive shift register is filled with data bytes;

wherein the status bit indicating whether the receive shift register currently contains at least one residual data byte being set in a first state when the receive shift register currently contains at least one residual data byte, the status bit indicating whether the receive shift register currently contains at least one residual data byte being set in a second state when the receive shift register receives a new data transmission;

wherein each of the remaining (N−1) status bits being set in a first state when there is a residual data byte at a predetermined corresponding data byte location in the receive shift register, each of the remaining (N−1) status bits being set in a second state after the residual data byte at the predetermined corresponding data byte location in the receive shift register has been popped or transferred to the receive FIFO;

wherein the residual data bytes stored in the receive shift register being valid and therefore not to be ignored when two consecutive readings of the status register reveals that:

the status bit indicating whether the receive shift register currently contains at least one residual data byte and one or more of the remaining (N−1) status bits are set in the first state in the first reading;

the status bit indicating whether the receive shift register currently contains at least one residual data byte is set in the first state, and the remaining (N−1) status bits are set in the second state in the second reading.

2. The arrangement of claim 1, wherein the receive shift register having a storage capacity of 2 data bytes.

3. The arrangement of claim 2 wherein the receive FIFO having a storage capacity of 4-by-2 data bytes.

4. A computer system adapted to effectively retrieve residual data received from a serial data source comprising:

a bus;

a central processor connected to the bus;

a serial interface coupled to the bus and the serial data source, the serial interface comprising:

a FIFO controller;

a receive shift register connected to the FIFO controller, the receive shift register having a storage capacity of N data bytes, the receive shift register receiving data from the serial data source; and a receive FIFO connected to the receive register and the FIFO controller, the receive FIFO having a storage capacity of at least N data bytes, the receive FIFO receiving data transferred in parallel from the receive shift register when the receive shift register is full, the receive FIFO outputting data received in parallel, the FIFO controller monitoring activities and content of the receive shift register in response to the central processor, the FIFO controller controlling data transfer to and from the receive shift register and the receive FIFO in response to the central processor;

a status register connected to the bus, the central processor setting status bits in the status register to reflect the activities and the content of the receive shift register, wherein the status register having N status bits, one of the N status bits indicating whether the receive shift register currently contains at least one residual data byte, each of the remaining (N−1) status bits indicating whether there is a residual data byte at a predetermined corresponding data byte location in the receive shift register, wherein data stored in the receive shift register being popped to the receive FIFO in response to a command from the central processor, the data stored in the receive shift register being transferred to the receive FIFO when the receive shift register is filled with data bytes, wherein the status bit indicating whether the receive shift register currently contains at least one residual data byte being set in a first state when the receive shift register currently contains at least one residual data byte, the status bit indicating whether the receive shift register currently contains at least one residual data byte being set in a second state when the receive shift register receives a new data transmission, wherein each of the remaining (N−1) status bits being set in a first state when there is a residual data byte at a predetermined corresponding data byte location in the receive shift register, each of the remaining (N−1) status bits being set in a second state after the residual data byte at the predetermined corresponding data byte location in the receive shift register has been popped or transferred to the receive FIFO; and memory coupled to the bus, the memory storing instruction codes, the instruction codes when executed by the central Processor determining, based on the status bits, which residual data to ignore in the receive FIFO, the processor utilizing information as to which residual data to ignore to selectively retrieve data outputted by the receive FIFO;

wherein the residual data bytes stored in the receive shift register being valid and therefore not to be ignored when two consecutive readings of the status register reveals that:

the status bit indicating whether the receive shift register currently contains at least one residual data byte and one or more of the remaining (N−1) status bits are set in the first state in the first reading;

the status bit indicating whether the receive shift register currently contains at least one residual data byte is set in the first state, and the remaining (N−1) status bits are set in the second state in the second reading.

5. The computer system of claim 4, wherein the receive shift register having a storage capacity of 2 data bytes, the receive FIFO having a storage capacity of 4-by-2 data bytes.

* * * * *